Nov. 15, 1932. V. G. APPLE 1,888,063
VEHICLE CONTROL MECHANISM
Filed Jan. 27, 1930
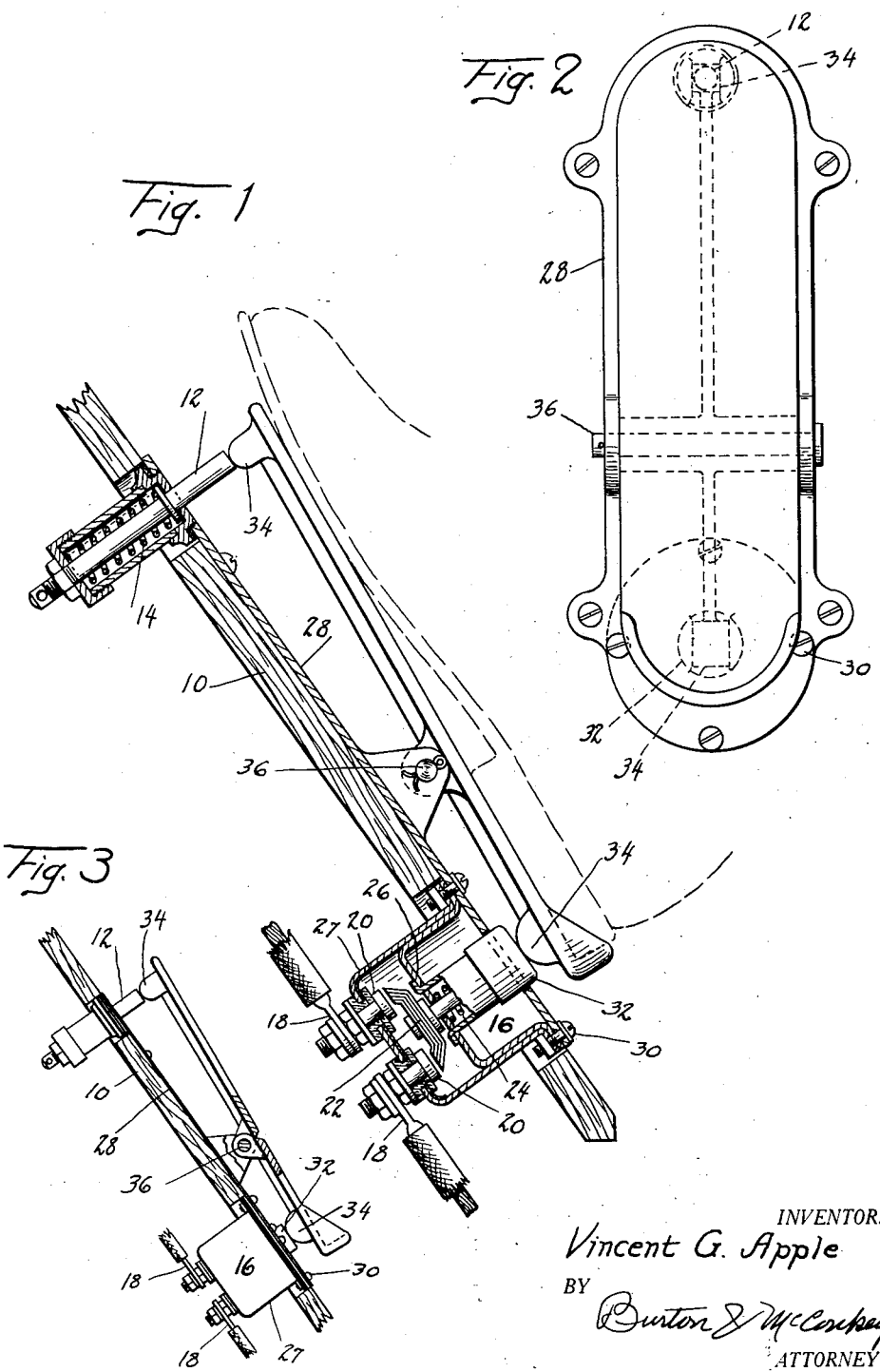
INVENTOR.
Vincent G. Apple
BY
Burton & McConkey
ATTORNEYS Patented Nov. 15, 1932

1,888,063

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

VEHICLE CONTROL MECHANISM

Application filed January 27, 1930. Serial No. 423,644.

My invention relates to a vehicle control mechanism, and has particular reference to means operated by the operator's foot for controlling various parts of an automobile vehicle.

One major object of my invention is to reduce the number of operating parts utilized in the control mechanism to a minimum, and thus reduce to a minimum the expense involved in providing such parts.

Another object of importance is to minimize the effort which is required of the operator in manipulating various essential control mechanisms.

More particularly, an object is the provision of a single control device operable to control both the acceleration and retardation of a motor vehicle, which is here movable in one direction to actuate the accelerator mechanism and in another direction to apply the brakes, and wherein a feature of importance is the fact that it precludes the possibility of the operator pushing down the accelerator of the vehicle when applying the brakes, thus nullifying by one operation what he accomplishes in the other.

In attaining the above objects it is my particular aim to permit such accomplishment without requiring the operator of the vehicle to be unduly conscious of the manner in which he manipulates the accelerator, that is, as to whether his foot is in the proper position to actuate the accelerator or whether it is in position to operate another control mechanism.

Other meritorious features of my invention will appear from the following description taken in conjunction with the drawing wherein like numerals refer to like parts throughout the several figures, and wherein:

Fig. 1 is a side elevation, partly in section, of my combined control mechanism illustrating the manner in which it is used, Fig. 2 is a plan view of the means whereby the operator's foot controls either the accelerator or some other control device, and Fig. 3 is a somewhat modified form of structure.

Since the advent of the automobile it has been customary to manipulate the flow of fuel to the automobile engine by pressure applied from the toe of the operator's foot. It has also been the custom for a similar period of time to apply the brakes in the same manner, utilizing a definite lever for the purpose. Such operation has always necessitated the vehicle operator removing his foot from the foot accelerator and applying it to the brake pedal. In instances where rapid action is required, it is obvious that some means whereby the foot would not have to be moved bodily for the purpose of transferring its energy from one control mechanism to another would be extremely advantageous. This is particularly true with the relatively high speeds at which automobiles now travel over the road.

Furthermore, inasmuch as it has been customary for so very long to utilize pressure applied with the toe of the foot to actuate the accelerator, it would be of distinct advantage to provide some means whereby, without moving the foot, pressure exerted by some other portion of the foot would serve to actuate some other control mechanism. Such an arrangement would not necessitate the ordinary vehicle driver accustoming himself to any radically different movement.

For this reason I have devised a combination of means for actuating the accelerator of a vehicle by pressure with the toe of the foot while permitting the simple transfer of pressure from toe to heel to close an electric switch which in turn permits a circuit through any one of a number of possible automotive vehicle mechanisms. It is my particular thought that this electric switch be utilized to control any of the various types of electric brakes now available to the public.

In Fig. 1 the numeral 10 illustrates the toe board of the conventional automobile. Toward the upper end of this toe board an accelerator pedal 12 is secured in the usual manner, normally tending to remain in its uppermost position by reason of the upward pressure of the spring member 14, and connected by any suitable linkage to the fuel feed mechanism. Secured beneath a somewhat lower portion of the toe board 10, and in direct alignment with accelerator pedal 12, I have illustrated an electric switch indicated generally by the numeral 16. This switch is provided with the ordinary terminals 18, contact members 20, and bridge member 22. This bridge member 22 is normally retained in open circuit position, withdrawn from contact with the members 20, by means of the upward pressure of the spring 24 acting upon the button 32, which is secured to bridge member 22. The base of spring 24 seats upon the bottom of a cup shaped member 26 which, together with the casing 27 for the switch units, is secured to the bottom of a plate 28 by means of the bolts 30.

The actuating pedal is preferably one designed to fit the foot of the operator, as illustrated in Fig. 1, and is pivoted intermediate the accelerator and the switch button 32. Both the front and rear extremities of this foot pedal are provided on the bottom sides with a nub 34 one of which is designed to actuate the accelerator and the other the switch button 32.

Thus it is obvious that pressure exerted by the toe of the operator will actuate the accelerator 12, while pressure exerted by the operator's heel, necessitating release of the accelerator 12, will function to close the switch and provide an electric circuit through the brake operating mechanism.

It will be noted from Fig. 2 that this foot pedal is pivoted by means of the pin 36 at a point nearer the heel extremity than the toe extremity. A purpose in so pivoting this foot pedal is to insure the easy operation of the accelerator, while necessitating slightly more effort on the part of the vehicle operator to actuate the switch.

This is of obvious advantage inasmuch as the accelerator is the control which is used more frequently and should require less effort on the part of the vehicle operator.

In Fig. 3 I have illustrated a modified form of my invention wherein the toe portion and heel portion of my foot pedal are each pivoted independently about the pivot pin 36.

Other modifications of my device will be apparent to those skilled in the art and I intend to limit myself only within the scope of the appended claims.

I claim:

1. In combination with a control unit of the character described, a plate, a housing secured to one side of said plate at each extremity thereof, an operating plunger positioned within each of said housings extending through said plate to the opposite side thereof, and means yieldably urging each of said plungers to its extended position.

2. In combination with a control unit of the character described, a plate, a housing secured to one side of said plate at each extremity thereof, an operating plunger positioned within each of said housings extending through said plate to the opposite side thereof, means yieldably urging each of said plungers to its extended position, and ears extending away from said plate on the side opposite said housing intermediate thereof.

3. A control unit of the character described comprising a plate, a housing secured to one side of said plate at each extremity thereof, an operating plunger positioned within each of said housings extending through said plate to the opposite side thereof, means yieldably urging each of said plungers to its extended position, ears extending away from said plate on the side opposite said housing intermediate thereof, and a lever pivoted intermediate its extremities upon said ears, said lever overlapping each of said operating stems.

4. A control unit of the character described comprising a plate, a housing secured to one side of said plate at each extremity thereof, an operating plunger positioned within each of said housings extending through said plate to the opposite side thereof, means yieldably urging each of said plungers to its extended position, ears extending away from said plate on the side opposite said housing intermediate thereof, and a pair of levers pivoted to said ears and extending in opposite directions to overlap the operating stems respectively.

In testimony whereof, I sign this specification.

VINCENT G. APPLE.